US012136792B2

(12) United States Patent
Iizuka et al.

(10) Patent No.: US 12,136,792 B2

(45) Date of Patent: Nov. 5, 2024

(54) TERMINAL BLOCK ASSEMBLED TO METAL CASE

(71) Applicant: Yazaki Corporation, Tokyo (JP)

(72) Inventors: Hayato Iizuka, Shizuoka (JP); Yasuhiro Otsuta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 343 days.

(21) Appl. No.: 17/842,070

(22) Filed: Jun. 16, 2022

(65) Prior Publication Data

US 2022/0407246 A1 Dec. 22, 2022

(30) Foreign Application Priority Data

Jun. 22, 2021 (JP) ................................ 2021-102837

(51) Int. Cl.
*H01R 9/24* (2006.01)
*H01R 4/30* (2006.01)

(52) U.S. Cl.
CPC ............ *H01R 9/2425* (2013.01); *H01R 4/30* (2013.01)

(58) Field of Classification Search
CPC .......... H01R 4/30; H01R 9/16; H01R 9/2425; H01R 9/2483
USPC ........................... 439/709, 712, 715, 620.21
See application file for complete search history.

(56) References Cited

U.S. PATENT DOCUMENTS 4,880,397 A * 11/1989 Dawson, Jr. ....... H01R 13/7195 439/620.21
5,176,540 A * 1/1993 Knoll ..................... H04Q 1/142 439/709
5,411,417 A * 5/1995 Horn .................... H01R 9/2641 439/922
5,846,098 A * 12/1998 Shiga ................ H01R 13/6625 439/409
6,159,049 A * 12/2000 Schramme ............ H01R 43/20 439/620.21
6,188,560 B1 * 2/2001 Waas .................. H01R 4/2408 361/119
8,602,821 B2 * 12/2013 Fujisaki ................ H01R 43/20 439/620.09
8,624,689 B2 * 1/2014 Hsieh ................ H01R 13/6608 363/39
8,861,225 B2 * 10/2014 Kodama ............... H01G 2/106 439/620.21
8,870,599 B2 * 10/2014 Takemoto ............... H01G 2/04 439/620.21

(Continued)

FOREIGN PATENT DOCUMENTS

GB 2049302 A * 12/1980 .............. H01R 9/16
JP 4-75310 A 3/1992

(Continued)

*Primary Examiner* — Marcus E Harcum
(74) *Attorney, Agent, or Firm* — Sughrue Mion, PLLC

(57) ABSTRACT

A terminal block includes: busbars connected to a device; a collar through which a fastening member is inserted; a housing integrally molded with the busbars and the collar; and a capacitor including a casing and a ground terminal protruding from the casing, the capacitor connected to the busbars, in which the housing houses the casing in a state where the ground terminal faces the collar so that the ground terminal and the collar can be fastened together to a metal case by the fastening member.

2 Claims, 14 Drawing Sheets

(56) References Cited

U.S. PATENT DOCUMENTS

| | | | | |
|---|---|---|---|---|
| 2004/0161975 | A1* | 8/2004 | Sakai | H01R 12/7088 439/620.21 |
| 2011/0275251 | A1* | 11/2011 | Aoki | H01R 4/305 439/709 |
| 2013/0095696 | A1* | 4/2013 | Matsumura | H01R 13/696 439/620.26 |
| 2016/0126680 | A1* | 5/2016 | Maeda | H02K 11/0094 439/620.21 |
| 2017/0149349 | A1 | 5/2017 | Ando | |
| 2019/0006775 | A1 | 1/2019 | Kan et al. | |
| 2022/0029399 | A1* | 1/2022 | Isaji | H02G 3/16 |

FOREIGN PATENT DOCUMENTS

| | | | | |
|---|---|---|---|---|
| JP | 07-254455 | A | 10/1995 | |
| JP | 2017-98387 | A | 6/2017 | |
| JP | 2019-12590 | A | 1/2019 | |
| KR | 1052774 | B1 * | 8/2011 | H01M 2/1072 |

* cited by examiner

TERMINAL BLOCK ASSEMBLED TO METAL CASE

CROSS-REFERENCE TO RELATED APPLICATION(S)

The present application claims priority to and incorporates by reference the entire contents of Japanese Patent Application No. 2021-102837 filed in Japan on Jun. 22, 2021.

BACKGROUND OF THE INVENTION

1. Field of the Invention

The present invention relates to a terminal block.

2. Description of the Related Art

Conventionally, there is technology of connecting a capacitor to an electric wire or the like. Japanese Patent Application Laid-open No. H7-254455 discloses a connector attached with an electronic component including a housing and a terminal fitting assembly attached to the housing. The terminal fitting assembly of Japanese Patent Application Laid-open No. H7-254455 includes two female terminal fittings, two electric wires, one capacitor, and one resin molded body. The lead wires of the capacitor and the electric wires are crimped to the terminal fittings with barrels of the terminal fittings caulked.

It is studied to mount a capacitor on a terminal block having a busbar. In this case, it is desirable that the work of assembling the terminal block to a metal case can be made efficient. For example, if the step of fixing the terminal block to the metal case and the step of connecting a ground terminal of the capacitor to the case can be performed simultaneously, the assembling procedure can be made efficient.

SUMMARY OF THE INVENTION

An object of the present invention is to provide a terminal block that can be efficiently assembled to a metal case.

A terminal block according to one aspect of the present invention includes: a busbar connected to a device; a collar through which a fastening member is inserted; a housing integrally molded with the busbar and the collar; and a capacitor comprising a casing and a ground terminal protruding from the casing, the capacitor connected to the busbar, wherein the housing holds the casing in a state where the ground terminal faces the collar so that the ground terminal and the collar can be fastened together to a metal case by the fastening member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a terminal block according to an embodiment of the present invention will be described in detail with reference to the drawings. Note that the invention is not limited by the embodiment. In addition, components in the following embodiment include those that can be easily conceived by those skilled in the art or those that are substantially the same.

Embodiment

Figure 1:
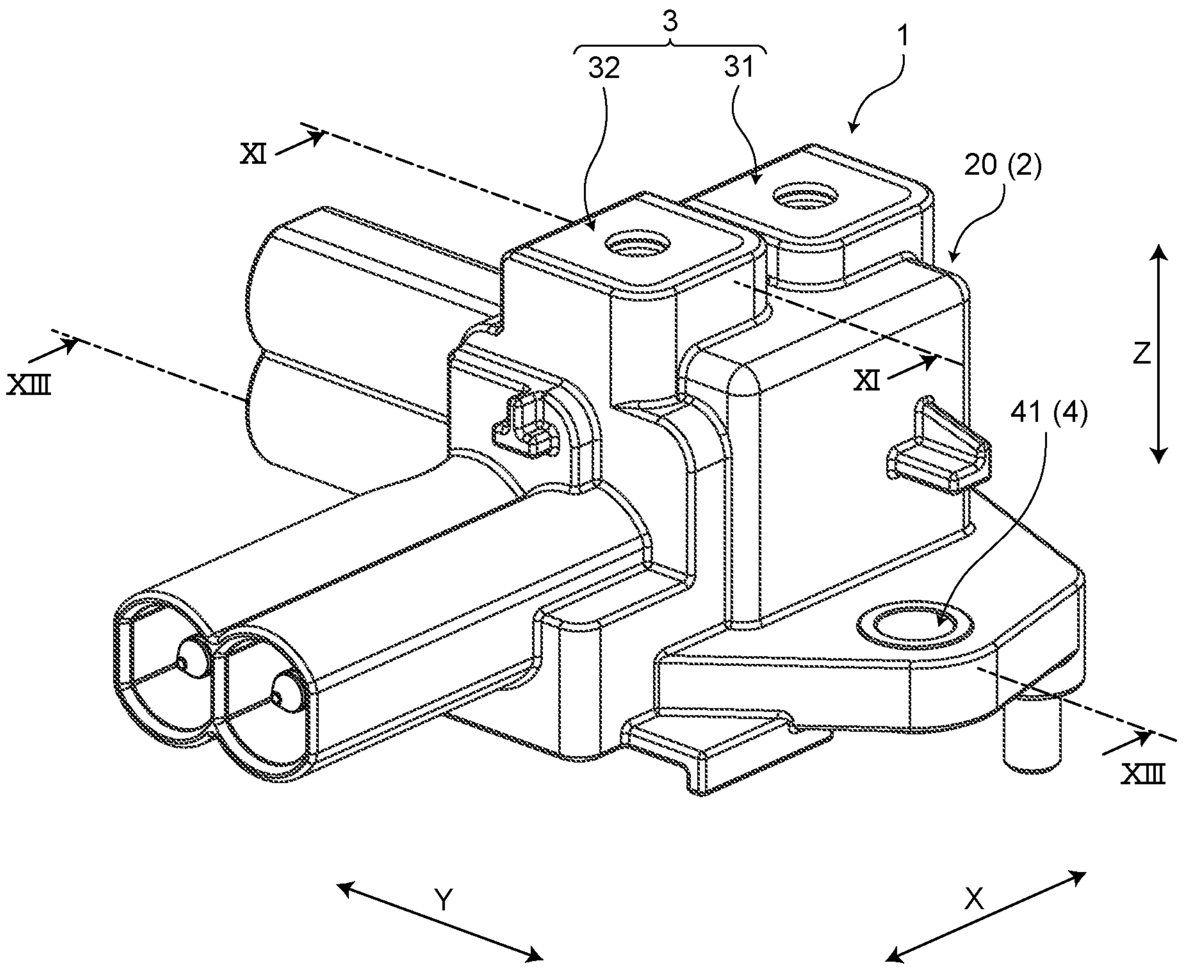
FIG. 1 is a perspective view of a terminal block according to an embodiment.
Figure 2:
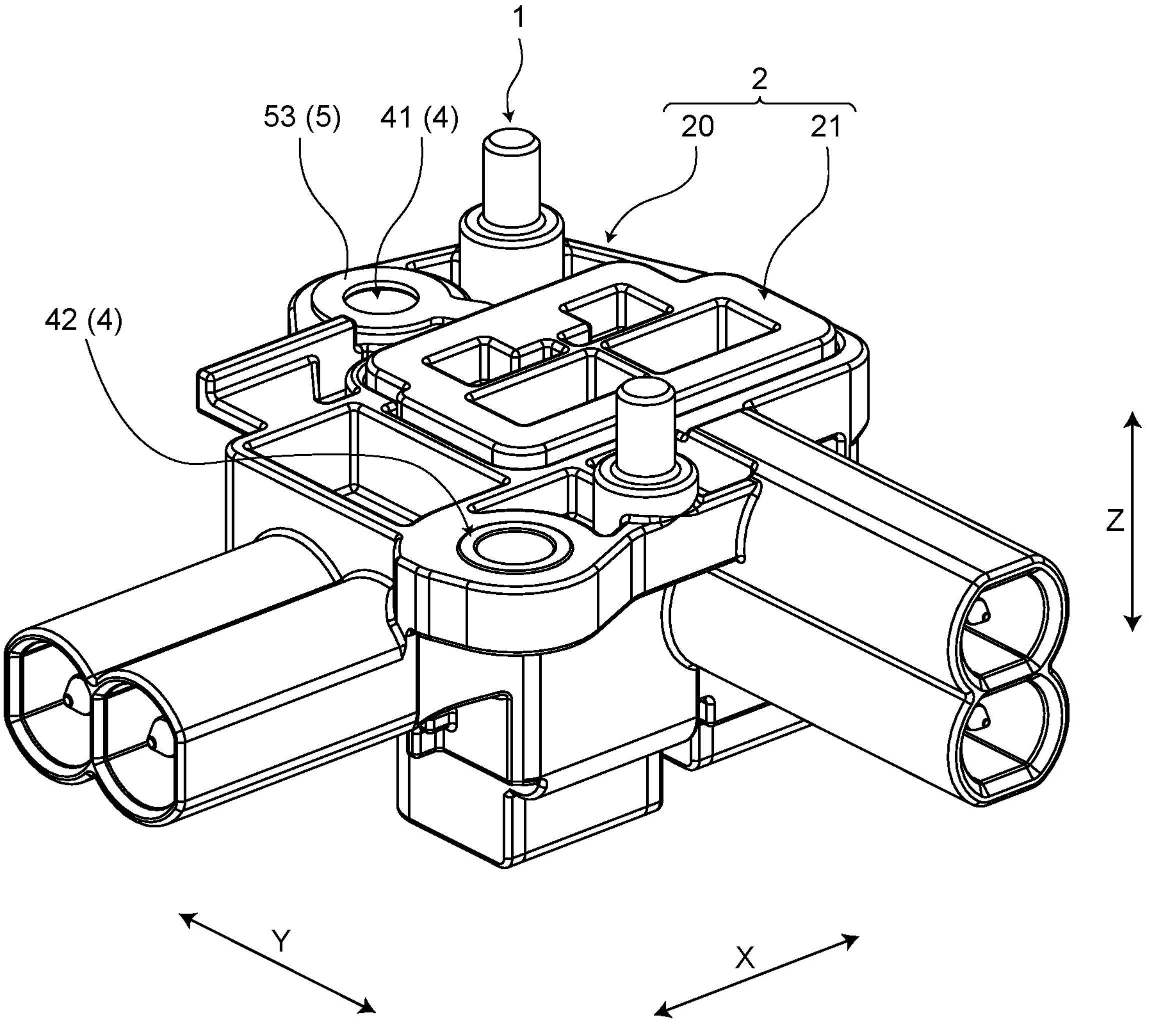
FIG. 2 is a perspective view of the terminal block of the embodiment.
Figure 4:
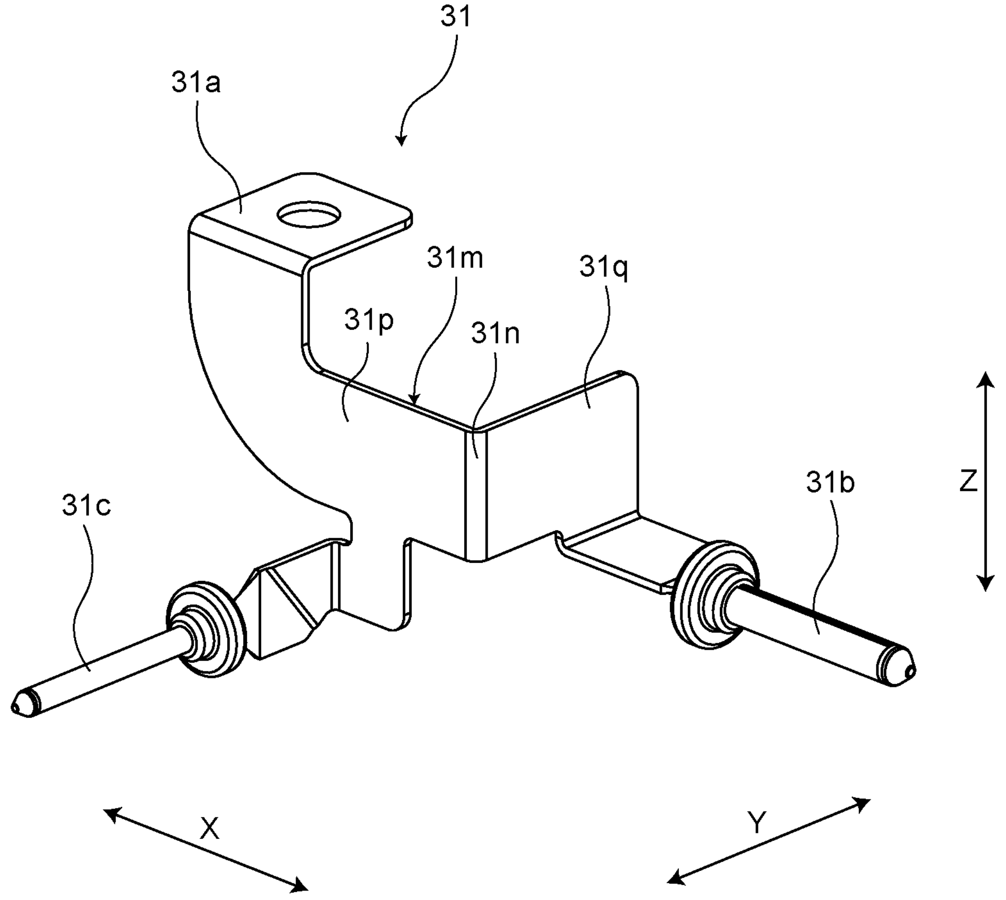
FIG. 4 is a perspective view of a busbar of the embodiment.
Figure 5:
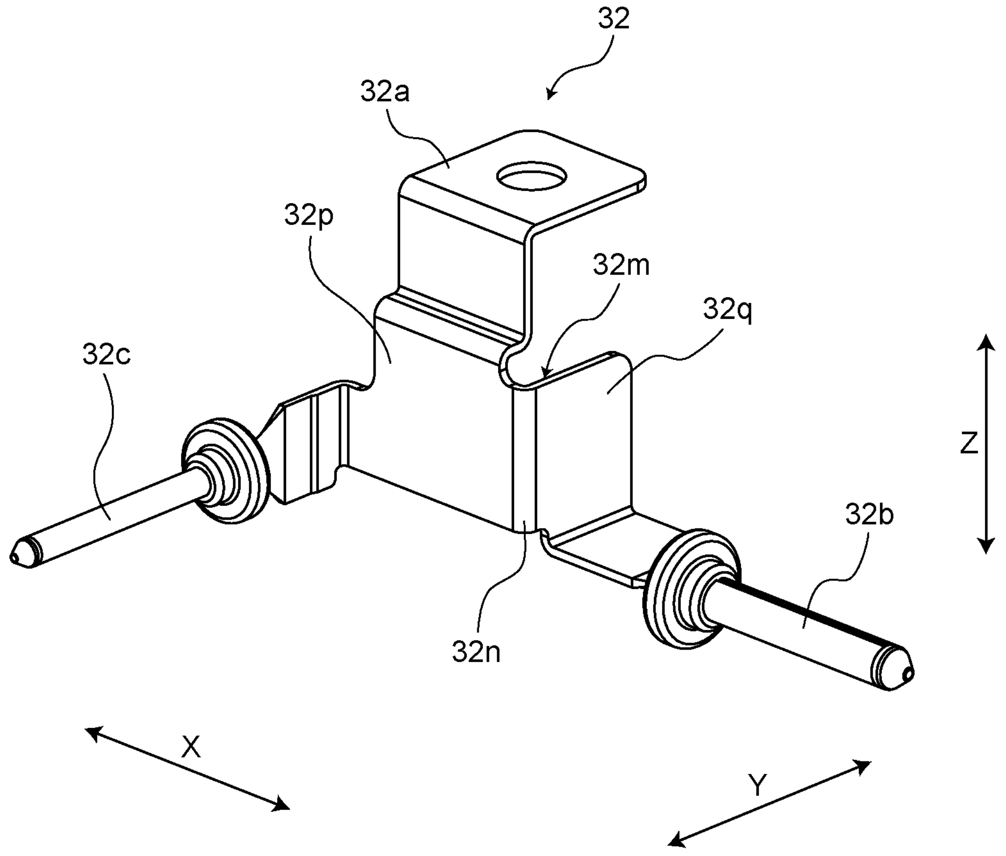
FIG. 5 is a perspective view of a busbar of the embodiment.
Figure 6:
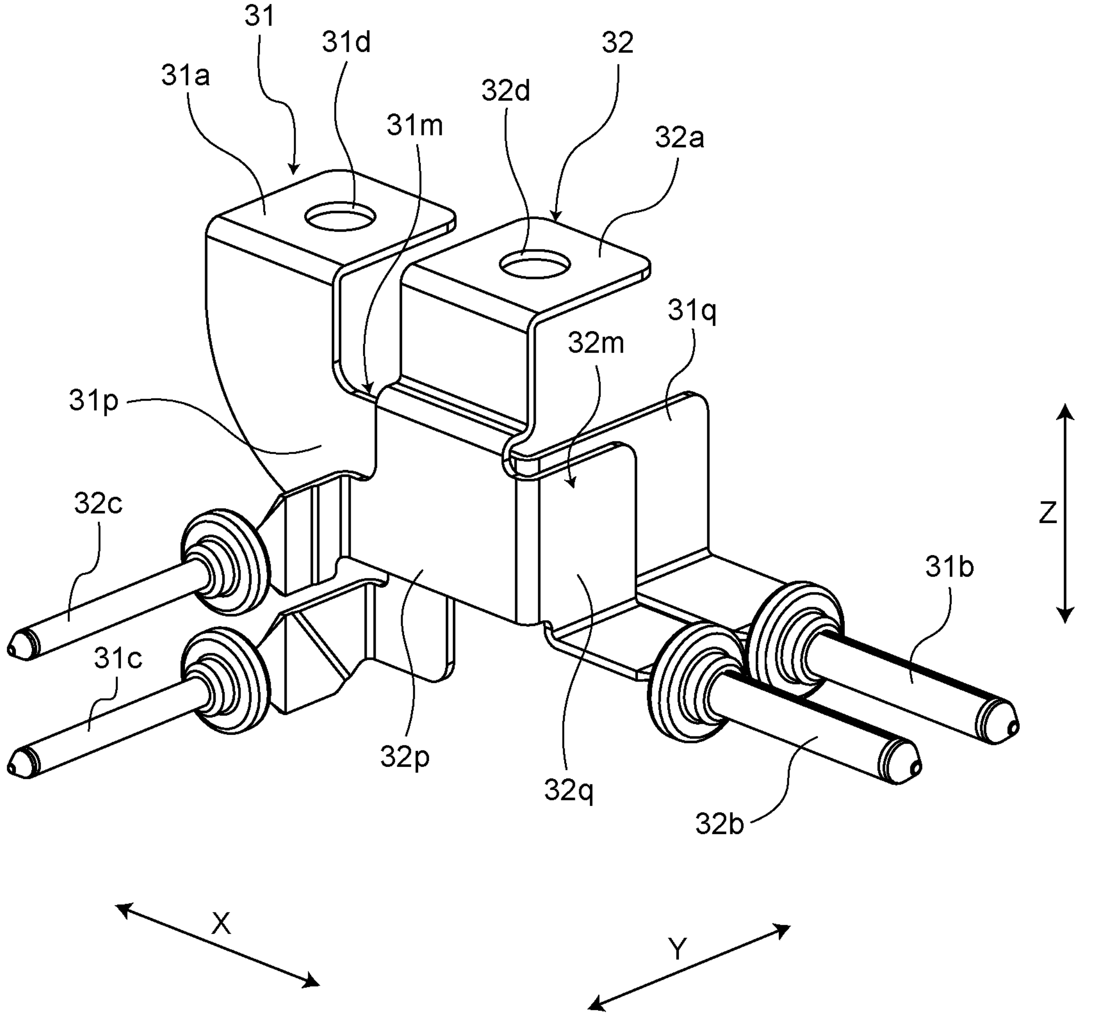
FIG. 6 is a perspective view illustrating a positional relationship of the busbars of the embodiment.
Figure 7:
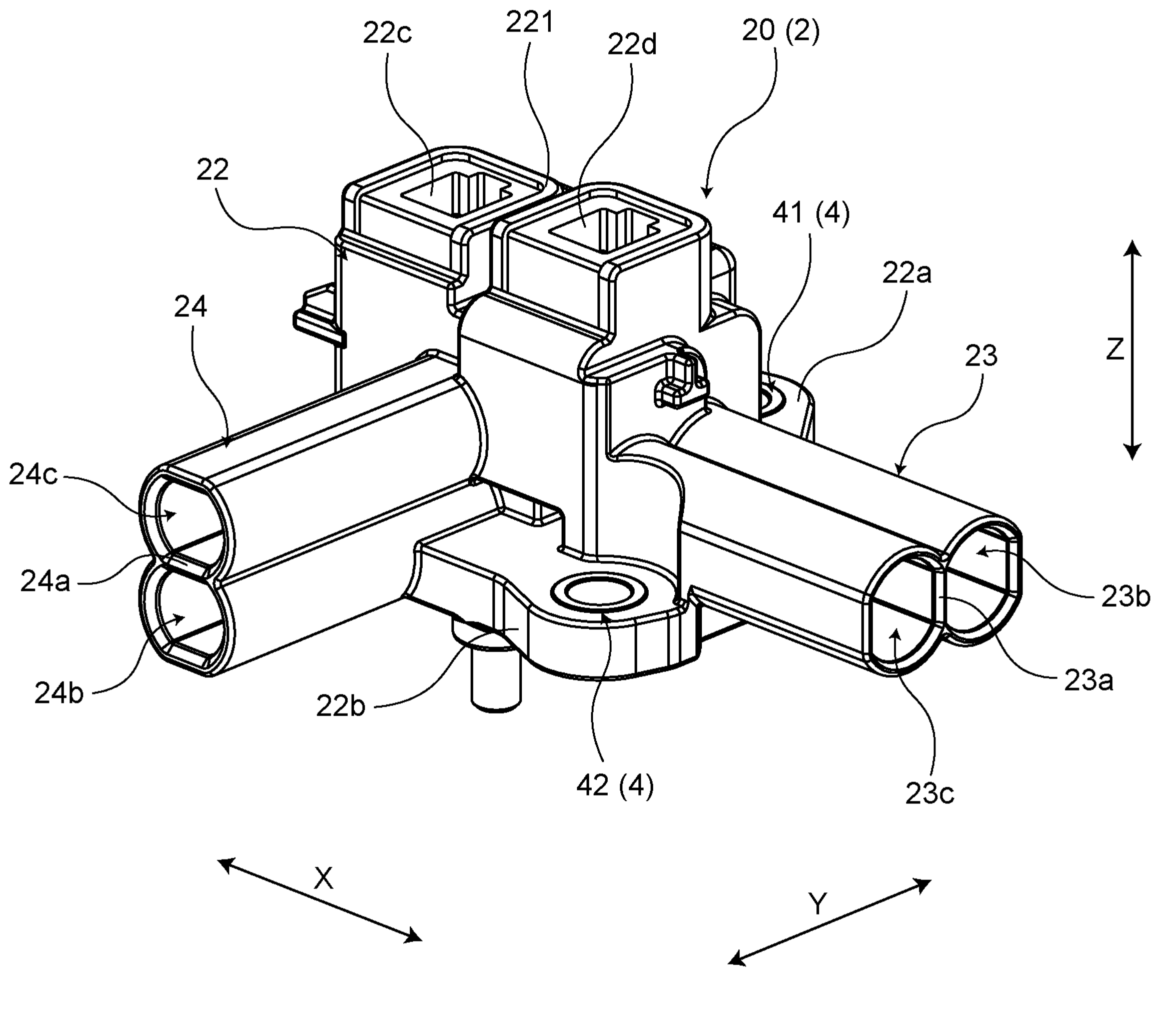
FIG. 7 is a perspective view of a housing of the embodiment.
Figure 8:
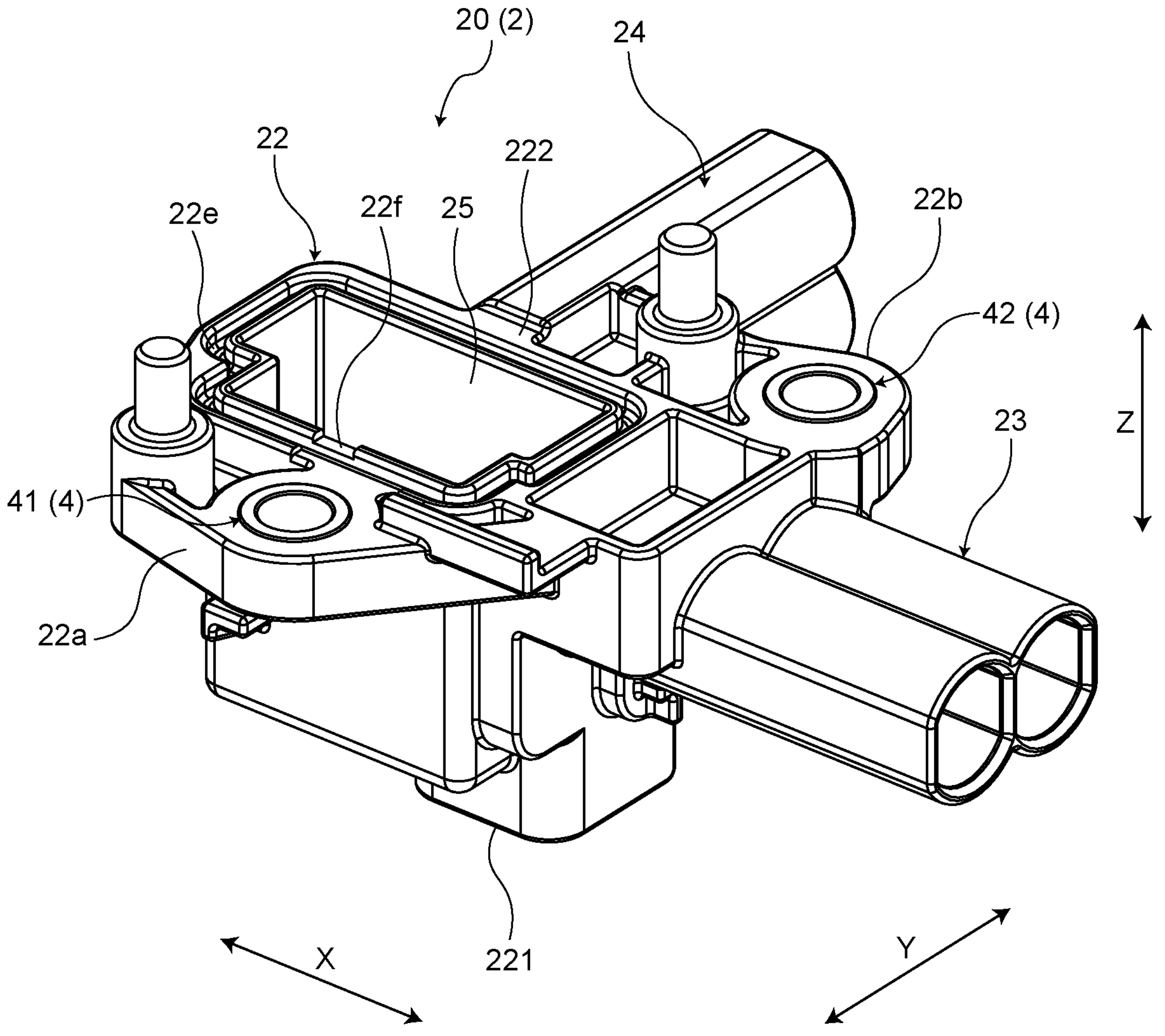
FIG. 8 is a perspective view of the main body of the housing of the embodiment.
Figure 9:
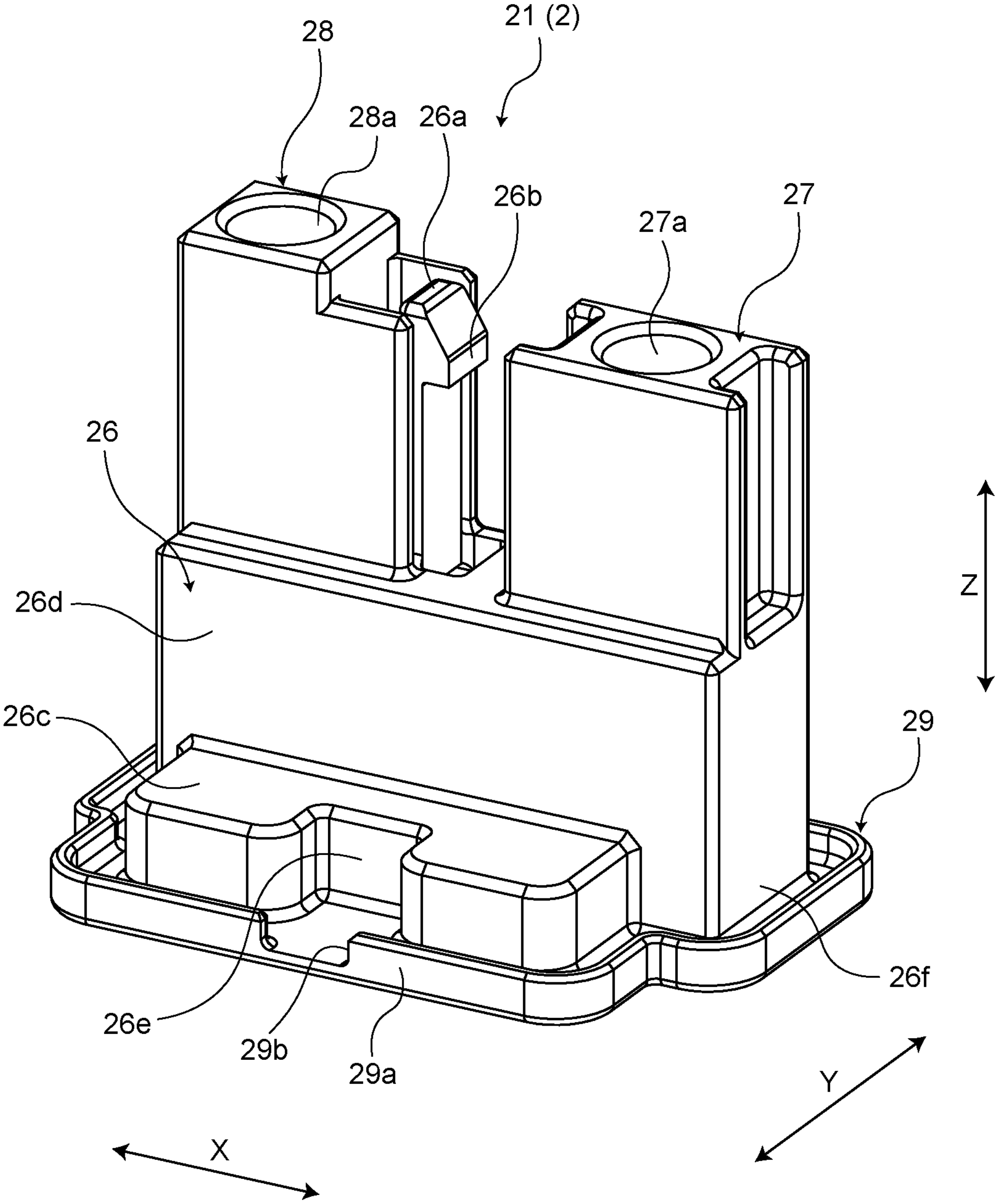
FIG. 9 is a perspective view of a nut holder of the embodiment.
Figure 10:
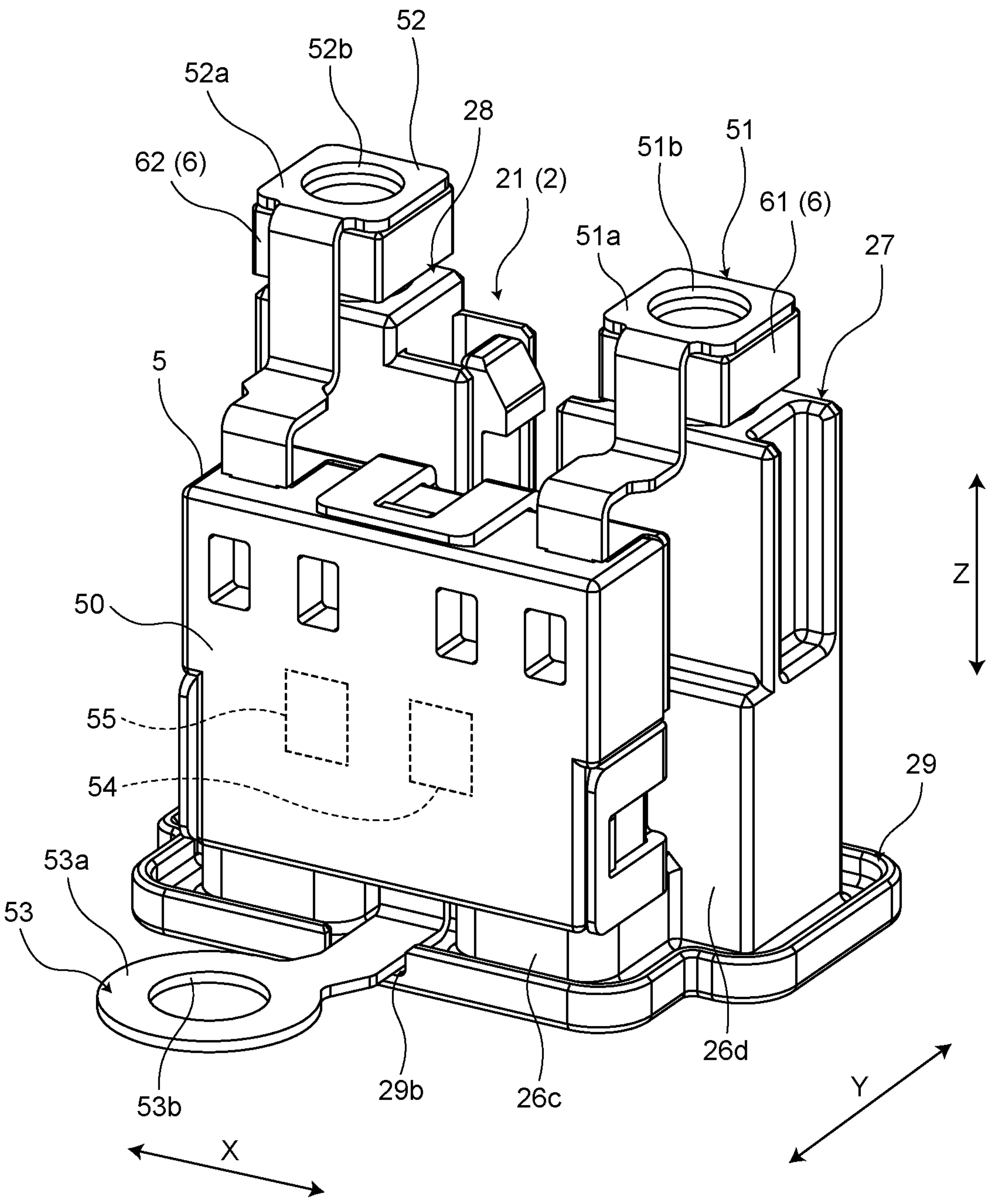
FIG. 10 is a perspective view illustrating a positional relationship of members inside an accommodating portion.

An embodiment will be described with reference to FIGS. 1 to 14. The present embodiment relates to a terminal block. FIGS. 1 and 2 are perspective views of a terminal block according to an embodiment, FIG. 3 is an exploded perspective view of the terminal block of the embodiment, FIGS. 4 and 5 are perspective views of busbars of the embodiment, FIG. 6 is a perspective view illustrating a positional relationship of the busbars of the embodiment, FIG. 7 is a perspective view of a housing of the embodiment, FIG. 8 is a perspective view of the main body of the housing of the embodiment, FIG. 9 is a perspective view of a nut holder of the embodiment, and FIG. 10 is a perspective view illustrating a positional relationship of members inside an accommodating portion.

Figure 11:
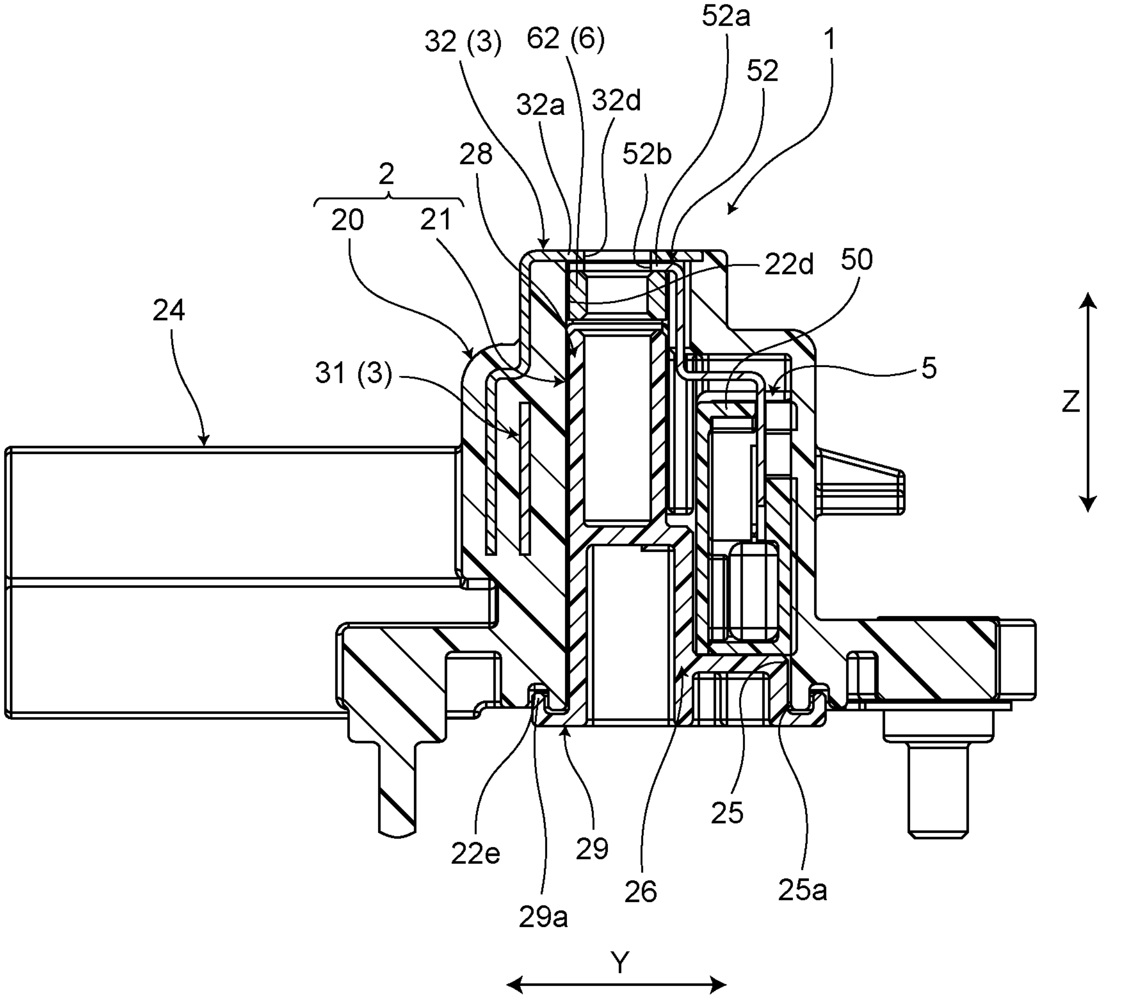
FIG. 11 is a cross-sectional view of the terminal block of the embodiment.
Figure 12:
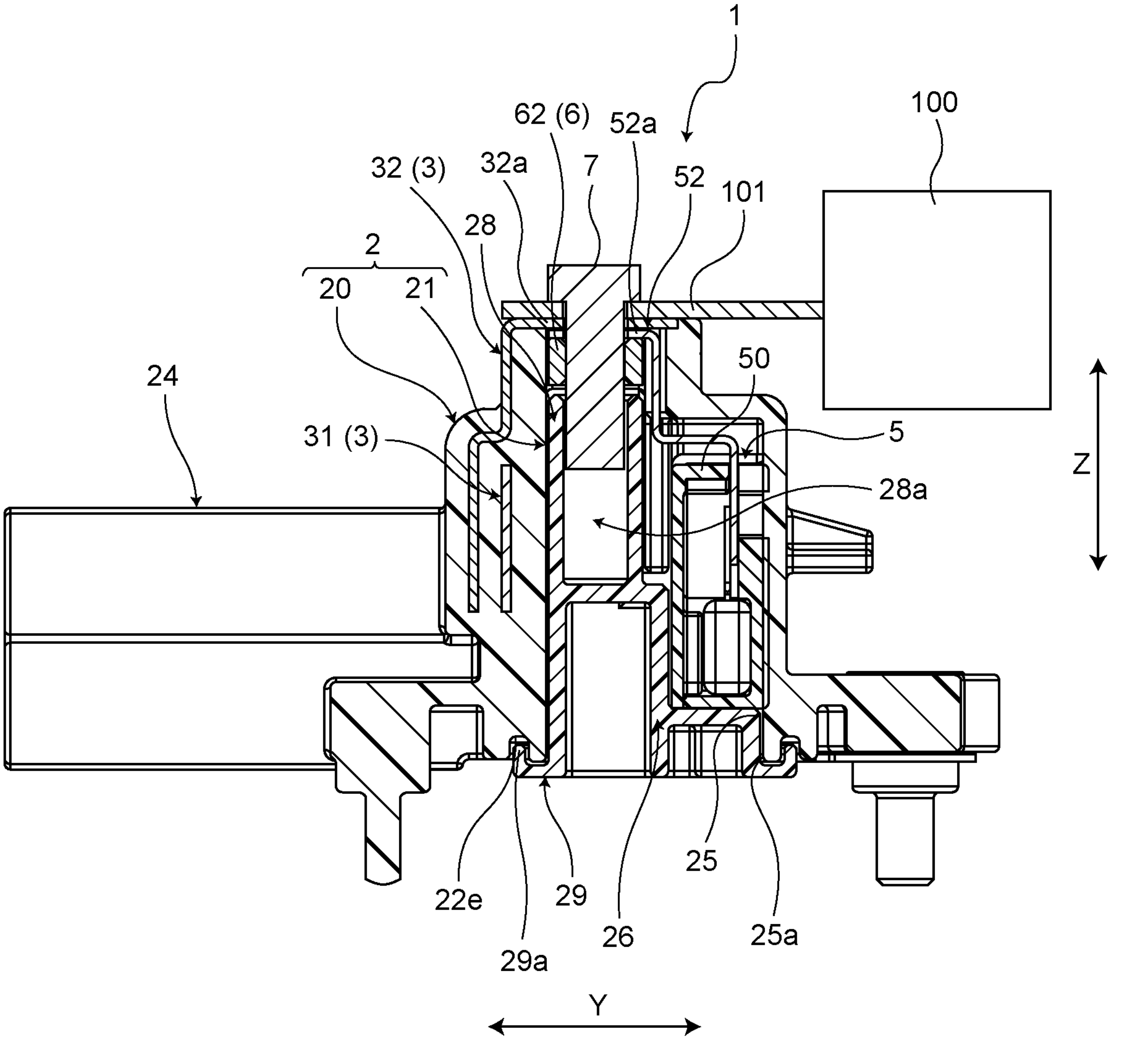
FIG. 12 is a cross-sectional view of the terminal block connected to a terminal.
Figure 13:
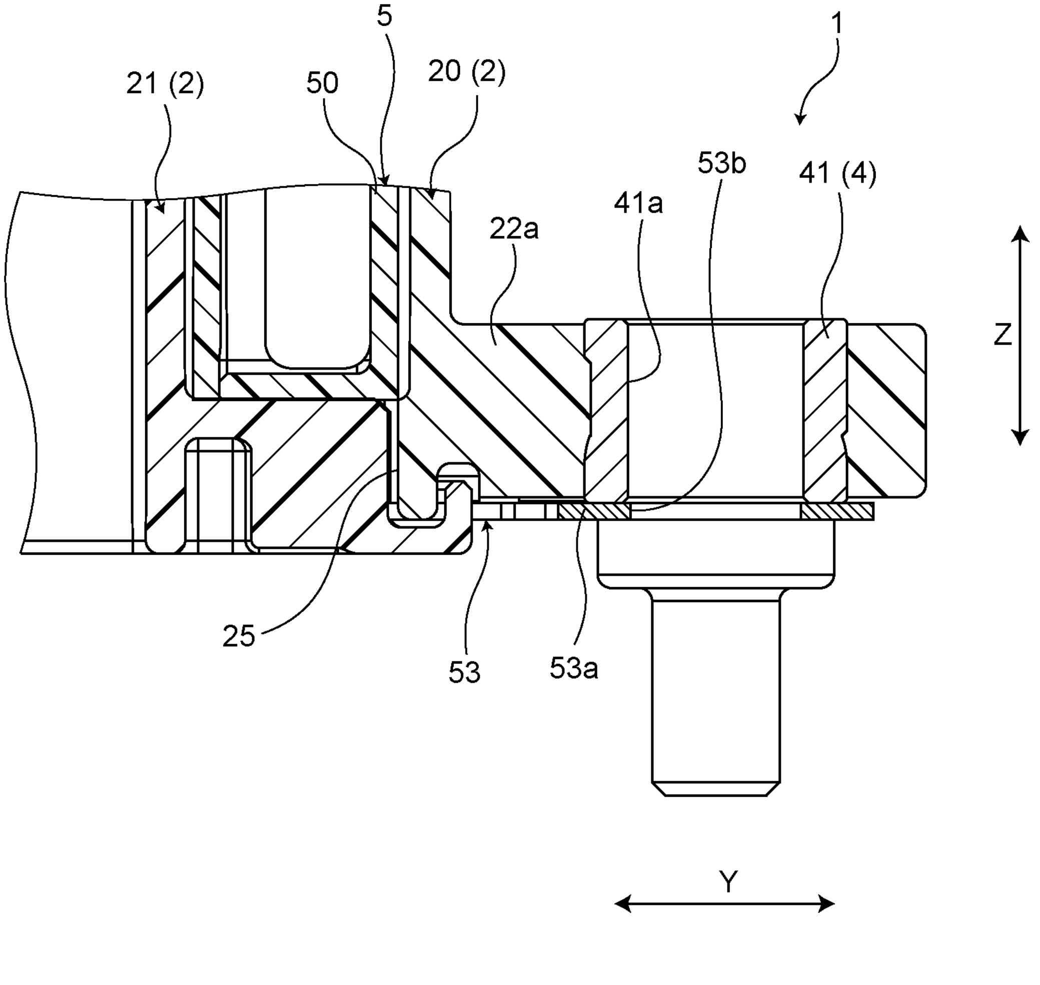
FIG. 13 is a cross-sectional view of the terminal block of the embodiment.
Figure 14:
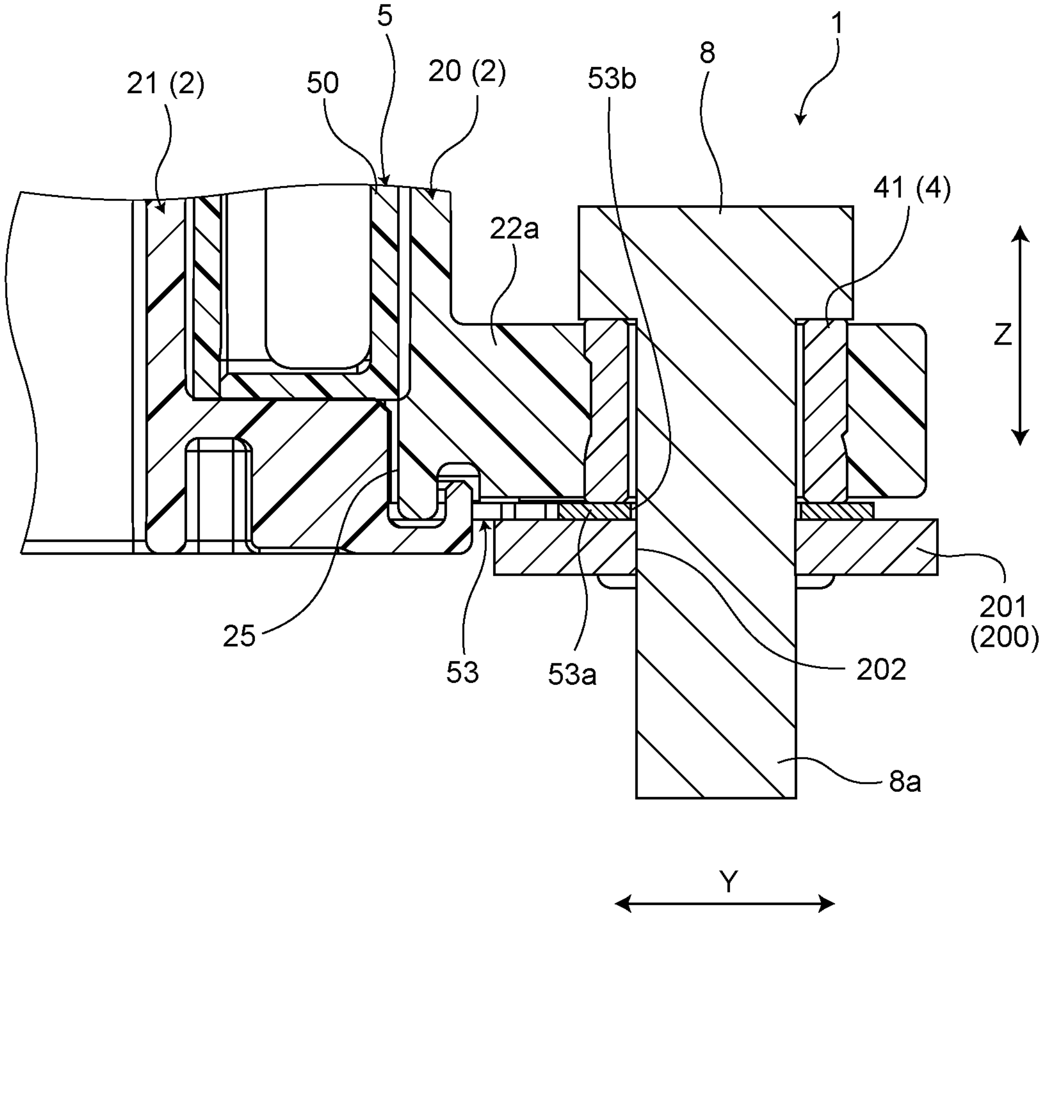
FIG. 14 is a cross-sectional view of the terminal block connected to a metal case.

FIG. 11 is a cross-sectional view of the terminal block of the embodiment, FIG. 12 is a cross-sectional view of the terminal block connected to a terminal, FIG. 13 is a cross-sectional view of the terminal block of the embodiment, and FIG. 14 is a cross-sectional view of the terminal block connected to a metal case. Illustrated in FIG. 11 is a cross section taken along line XI-XI in FIG. 1. Illustrated in FIG. 13 is a cross section taken along line XIII-XIII in FIG. 1.

Figure 3:
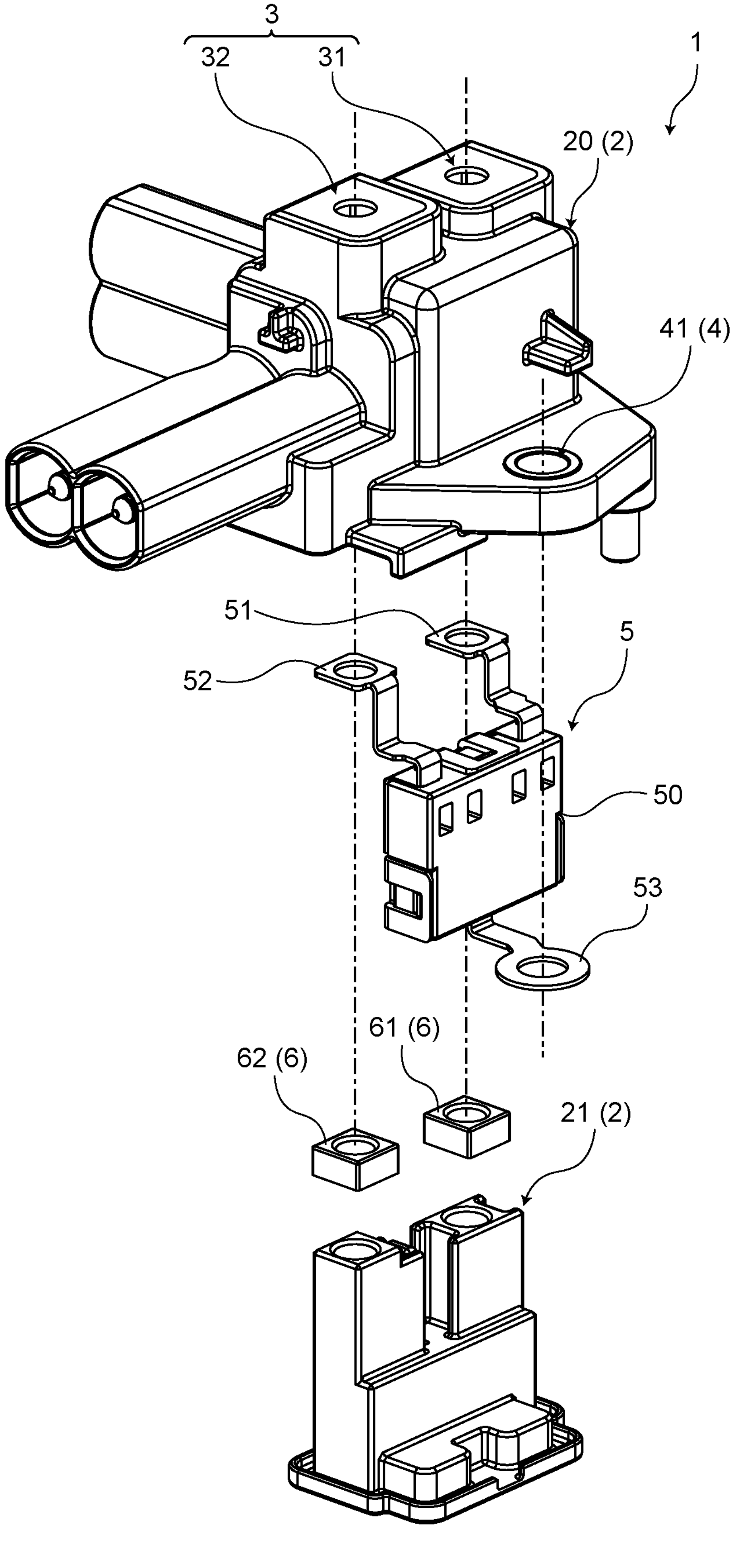
FIG. 3 is an exploded perspective view of the terminal block of the embodiment.

As illustrated in FIGS. 1 to 3, a terminal block 1 of the embodiment includes a housing 2, busbars 3, collars 4, a capacitor 5, and nuts 6. The terminal block 1 is mounted on, for example, a vehicle such as a hybrid vehicle or a plug-in hybrid vehicle. The terminal block 1 illustrated connects a power source of the vehicle, a device, and a load. The power source of the vehicle is, for example, a battery that can be charged and discharge electricity.

The device connected to the terminal block 1 is, for example, a power control unit (PCU) 100 interposed between the power source and motors for traveling. The PCU 100 is a control unit including a control circuit, an inverter, and a converter. In the present embodiment, the terminal block 1 will be described on the premise that a counterpart device connected to the terminal block 1 is the PCU 100. The load connected to the terminal block 1 is a load that receives power supply from a power source and is, for example, an air conditioner. The power source supplies DC power to the load via the terminal block 1.

As illustrated in FIGS. 2 and 3, the housing 2 has a main body 20 and a nut holder 21. The main body 20 and the nut holder 21 are molded from, for example, insulating synthetic resin. The main body 20 is molded integrally with the busbars 3 and the collars 4 and holds the busbars 3 and the collars 4. The nut holder 21 is a member that engages with the main body 20 and supports the nuts 6 and the capacitor 5.

A busbar 3 is a conductor formed of a conductive metal such as copper. The busbars 3 connect the power source, the PCU 100, and the load to each other. The terminal block 1 of the present embodiment includes two busbars 31 and 32 as the busbars 3.

A collar 4 is structured so that a fastening member such as a bolt can be inserted therethrough. A collar 4 is formed of, for example, a conductive metal. The illustrated shape of the collars 4 is a cylindrical shape. The terminal block 1 of the present embodiment has two collars 41 and 42 as the collars 4. As described later, the collar 41 is fastened together with a ground terminal 53 of the capacitor 5 to a metal case 201.

As illustrated in FIG. 3 and other drawings, the capacitor 5 includes a casing 50, connection terminals 51 and 52, and the ground terminal 53. The connection terminals 51 and 52 and the ground terminal 53 protrude outward from the casing 50. The connection terminal 51 is connected to one busbar 31, and the connection terminal 52 is connected to the other busbar 32. The ground terminal 53 is grounded to the metal case 201.

The nuts 6 are supported by the nut holder 21. The exemplified nuts 6 are square nuts each having a square shape in plan view. The terminal block 1 of the present embodiment includes two nuts 61 and 62 as the nuts 6. The busbar 31 and the connection terminal 51 are fastened together to one terminal of the PCU 100 by the nut 61 and a bolt. The busbar 32 and the connection terminal 52 are fastened together to another terminal of the PCU 100 by the nut 62 and a bolt.

As illustrated in FIG. 4, the busbar 31 includes a first terminal portion 31*a,* a second terminal portion 31*b,* a third terminal portion 31*c,* and a main body 31*m*. The main body 31*m* has a plate shape and includes a first base portion 31*p,* a second base portion 31*q,* and a bent portion 31*n*. The bent portion 31*n* is a portion where the first base portion 31*p* and the second base portion 31*q* intersect each other and is bent at a right angle.

The first terminal portion 31*a* and the third terminal portion 31*c* are connected to the first base portion 31*p*. More specifically, the first terminal portion 31*a* is formed at an end of the first base portion 31*p* on the side opposite to the second base portion 31*q*. The third terminal portion 31*c* protrudes in a direction orthogonal to the first base portion 31*p*. The third terminal portion 31*c* is a male terminal formed by rounding a metal plate into a cylindrical shape. The second terminal portion 31*b* protrudes in a direction orthogonal to the second base portion 31*q*. The second terminal portion 31*b* is a male terminal formed by rounding a metal plate into a cylindrical shape.

The axial direction of the second terminal portion 31*b* and the axial direction of the third terminal portion 31*c* are orthogonal to each other. In the description of the terminal block 1, the axial direction of the second terminal portion 31*b* is referred to as a "first direction X", and the axial direction of the third terminal portion 31*c* is referred to as a "second direction Y". Moreover, a direction orthogonal to both of the first direction X and the second direction Y is referred to as a "third direction Z". The first terminal portion 31*a* is orthogonal to the third direction Z. The main body 20 of the housing 2 is integrated with the main body 31*m* by insert molding.

The structure of the busbar 32 is similar to the structure of the busbar 31. As illustrated in FIG. 5, the busbar 32 includes a first terminal portion 32*a,* a second terminal portion 32*b,* a third terminal portion 32*c,* and a main body 32*m*. The main body 32*m* has a plate shape and includes a first base portion 32*p,* a second base portion 32*q,* and a bent portion 32*n*. The bent portion 32*n* is a portion where the first base portion 32*p* and the second base portion 32*q* intersect each other and is bent at a right angle.

The first terminal portion 32*a* and the third terminal portion 32*c* are connected to the first base portion 32*p*. The first terminal portion 32*a* is orthogonal to the third direction Z. The third terminal portion 32*c* protrudes in the second direction Y with respect to the first base portion 32*p*. The second terminal portion 32*b* is connected with the second base portion 32*q*. The second terminal portion 32*b* protrudes in the first direction X with respect to the second base portion 32*q*. The main body 20 of the housing 2 is integrated with the main body 32*m* by insert molding.

Illustrated in FIG. 6 is a positional relationship between the busbars 31 and 32 held by the housing 2. The main body 32*m* of the busbar 32 is disposed on the outer side with respect to the main body 31*m* of the busbar 31. Moreover, the busbar 32 is disposed so that the first base portion 32*p* faces the first base portion 31*p* of the busbar 31 and that the second base portion 32*q* faces the second base portion 31*q* of the busbar 31. The two main bodies 31*m* and 32 m are bent so as to surround an accommodating portion 25 of the main body 20.

The two first terminal portions 31*a* and 32*a* are arranged along the first direction X. The first terminal portions 31*a* and 32*a* include through holes 31*d* and 32*d,* respectively, through which bolts 7 are inserted. The two second terminal portions 31*b* and 32*b* are arranged along the second direction Y. The two third terminal portions 31*c* and 32*c* are arranged along the third direction Z.

In FIGS. 7 and 8, the main body 20 of the housing 2 is illustrated. Note that in FIGS. 7 and 8, the busbars 3 are not illustrated. The main body 20 includes a main portion 22, a first cylindrical portion 23, and a second cylindrical portion 24. The main portion 22 is the main part of the main body 20 and is formed in a block shape. The main portion 22 has a substantially rectangular parallelepiped shape. The main portion 22 has two fixing portions 22*a* and 22*b* protruding laterally. One fixing portion 22*a* holds the collar 41, and the other fixing portion 22*b* holds the collar 42. The collars 41 and 42 penetrate the fixing portions 22*a* and 22*b* along the third direction Z.

The main portion 22 has two nut holes 22*c* and 22*d*. The nut holes 22*c* and 22*d* are included in a first end 221 of the main portion 22. The first end 221 is one end of the main portion 22 in the third direction Z. One end of each of the nut holes 22*c* and 22*d* is opened in the third direction Z. The other ends of the nut holes 22*c* and 22*d* communicate with the accommodating portion 25 to be described later. The shapes of the nut holes 22*c* and 22*d* in the cross section orthogonal to the third direction Z are rectangular. The nut holes 22*c* and 22*d* are formed so as to regulate the rotation of the nuts 6.

The first cylindrical portion 23 protrudes in the first direction X from one side face of the main portion 22. The inside of the first cylindrical portion 23 is partitioned into two spaces 23*b* and 23*c* by a partition wall 23*a*. One space 23*b* houses the second terminal portion 31*b* of the busbar 31, and the other space 23*c* houses the second terminal portion 32*b* of the busbar 32. For example, a connector on the power supply side is fitted to the first cylindrical portion 23.

The second cylindrical portion 24 protrudes in the second direction Y from another side face of the main portion 22. The inside of the second cylindrical portion 24 is partitioned into two spaces 24*b* and 24*c* by a partition wall 24*a*. One space 24*b* houses the third terminal portion 31*c* of the busbar 31, and the other space 24*c* houses the third terminal portion 32*c* of the busbar 32. For example, a connector on the load side is fitted to the second cylindrical portion 24.

As illustrated in FIG. 8, the main portion 22 includes the accommodating portion 25. The accommodating portion 25 opens at a second end 222 of the main portion 22. The second end 222 is an end of the main portion 22 on the side opposite to the first end 221 side. The accommodating portion 25 is recessed from the second end 222 toward the first end 221. The cross-sectional shape of the accommodating portion 25 in the cross section orthogonal to the third direction Z is substantially rectangular. The main portion 22 has a groove 22*e* that surrounds the opening of the accommodating portion 25. A notch 22*f* corresponding to the ground terminal 53 of the capacitor 5 is formed in a wall of the groove 22*e*.

As illustrated in FIG. 9, the nut holder 21 includes a base portion 26, a first support portion 27, a second support portion 28, and a lid portion 29. The base portion 26 has a substantially rectangular parallelepiped shape. The first support portion 27 and the second support portion 28 protrude from the base portion 26 in the third direction Z. The first support portion 27 and the second support portion 28 are arranged along the first direction X. The first support portion 27 and the second support portion 28 each have a prismatic shape. The first support portion 27 supports the nut 61 by a distal end surface of the first support portion 27. The second support portion 28 supports the nut 62 by a distal end surface of the second support portion 28. The distal end surfaces of the first support portion 27 and the second support portion 28 have recesses 27*a* and 28*a* corresponding to the bolts 7.

An arm-shaped engaging portion 26*a* is disposed between the first support portion 27 and the second support portion 28. The engaging portion 26*a* protrudes from the base portion 26 in the third direction Z. A claw 26*b* to be locked by the main body 20 is formed at the tip of the engaging portion 26*a*. The nut holder 21 is engaged with the main body 20 by the engaging portion 26*a*.

The base portion 26 has a third support portion 26*c* that supports the casing 50 of the capacitor 5. The third support portion 26*c* protrudes in the second direction Y from a side face 26*d* of the base portion 26. The third support portion 26*c* includes a recess 26*e* corresponding to the ground terminal 53 of the capacitor 5.

The lid portion 29 is a portion that closes an inlet of the accommodating portion 25. The lid portion 29 is connected to an end 26*f* of the base portion 26. A peripheral wall 29*a* is provided so as to erect on the edge of the lid portion 29. The peripheral wall 29*a* is inserted into the groove 22*e* of the main body 20. A notch 29*b* corresponding to the ground terminal 53 of the capacitor 5 is formed in the peripheral wall 29*a*.

Illustrated in FIG. 10 is a positional relationship of members inside the accommodating portion 25. The side face 26*d* of the nut holder 21 and the third support portion 26*c* support the casing 50 of the capacitor 5 and position the casing 50. The connection terminals 51 and 52 have contact portions 51*a* and 52*a* each having a flat plate shape. Through holes 51*b* and 52*b* corresponding to the bolts 7 are formed in the contact portions 51*a* and 52*a*, respectively.

The contact portion 51*a* is positioned on the side opposite to the first support portion 27 side with respect to the nut 61. The through hole 51*b* of the contact portion 51*a* faces a screw hole of the nut 61 in the third direction Z. The contact portion 52*a* is positioned on the side opposite to the second support portion 28 side with respect to the nut 62. The through hole 52*b* of the contact portion 52*a* faces a screw hole of the nut 62 in the third direction Z.

Two capacitor bodies 54 and 55 are arranged inside the casing 50. The capacitor bodies 54 and 55 are, for example, capacitor elements. The connection terminal 51 is connected to the ground terminal 53 via the capacitor body 54. The connection terminal 52 is connected to the ground terminal 53 via the capacitor body 55.

The ground terminal 53 protrudes to the external space via the notch 29*b* of the lid portion 29. The ground terminal 53 has a contact portion 53*a* having an annular shape. The contact portion 53*a* is located outside the lid portion 29. A through hole 53*b* corresponding to a fastening member 8 is formed in the contact portion 53*a*.

In a cross-sectional view of FIG. 11, a positional relationship among the busbar 32, the connection terminal 52, the nut 62, and the second support portion 28 is illustrated. The first terminal portion 32*a* of the busbar 32, the contact portion 52*a* of the connection terminal 52, the nut 62, and the second support portion 28 are arranged in this order along the third direction Z. That is, the contact portion 52*a* of the connection terminal 52 is positioned between the nut 62 and the first terminal portion 32*a*.

The nut holder 21 supports the nut 62 by the second support portion 28 so that the nut 62 faces the first terminal portion 32*a* of the busbar 32. The second support portion 28 positions the nut 62 inside the nut hole 22*d* of the main body 20. The through hole 32*d* of the busbar 32, the through hole 52*b* of the connection terminal 52, and the screw hole of the nut 62 are coaxially arranged. The nut holder 21 supports the capacitor 5 by the base portion 26 so that the contact portion 52*a* faces the first terminal portion 32*a*.

The positional relationship among the busbar 31, the connection terminal 51, the nut 61, and the first support portion 27 is similar to the positional relationship among the busbar 32, the connection terminal 52, the nut 62, and the second support portion 28. That is, the nut holder 21 supports the nut 61 by the first support portion 27 so that the nut 61 faces the first terminal portion 31*a* of the busbar 31. In addition, the nut holder 21 supports the capacitor 5 by the base portion 26 so that the connection terminal 51 faces the first terminal portion 31*a*.

As illustrated in FIG. 11, the lid portion 29 of the nut holder 21 closes an inlet 25*a* of the accommodating portion 25. The peripheral wall 29*a* of the lid portion 29 enters the groove 22*e* of the main body 20 and restricts intrusion of foreign matters or the like into the accommodating portion 25. That is, the nut holder 21 is structured so as to protect the capacitor 5 by making the inside of the accommodating portion 25 a closed space. In addition, the lid portion 29 can receive chips generated when the bolts are fastened to the nuts 6 and restrict the chips from coming out of the accommodating portion 25.

As illustrated in FIG. 12, the first terminal portion 32*a* of the busbar 32 and the connection terminal 52 are fastened together to a terminal 101 of the PCU 100 by a bolt 7 and the nut 62. The bolt 7 is inserted through the terminal 101, the first terminal portion 32*a,* and the connection terminal 52 and screwed with the nut 62. The recess 28*a* of the second support portion 28 receives the distal end of the bolt 7. Similarly, the first terminal portion 31*a* of the busbar 31 and the connection terminal 51 are fastened together to the other terminal of the PCU 100 by the bolt and the nut 61.

Illustrated in FIG. 13 is the ground terminal 53 in a state where the casing 50 of the capacitor 5 is housed in the accommodating portion 25. As illustrated in FIG. 13, the accommodating portion 25 houses the casing 50 and holds the casing 50 in a state where the contact portion 53*a* of the ground terminal 53 faces the collar 41. As a result, the ground terminal 53 and the collar 41 can be fastened together to the metal case by the fastening member.

The housing 2 that is illustrated is structured so that the through hole 53*b* of the ground terminal 53 is positioned coaxially with a through hole 41*a* of the collar 41 in a state where the casing 50 is housed in the accommodating portion 25. At this point, the contact portion 53*a* faces the collar 41 in the third direction Z. As illustrated in FIG. 13, the housing 2 holds the casing 50 so that the contact portion 53*a* is positioned in the vicinity of the collar 41. The housing 2 may hold the casing 50 in a state where the contact portion 53*a* is in contact with the collar 41.

As illustrated in FIG. 14, the ground terminal 53 of the capacitor 5 is grounded to the metal case 201 mounted on a vehicle 200. More specifically, the ground terminal 53 and the collar 41 are fastened together to the metal case 201 by the fastening member 8. The metal case 201 is, for example, a case of a device controlled by the PCU 100. The metal case 201 may be a case of an inverter. The metal case 201 is electrically connected to and grounded to a metal vehicle body panel included in the vehicle 200 and a conductive member disposed in the vehicle 200.

The fastening member 8 is a member having a shaft portion 8*a* that can be inserted into the ground terminal 53 and the collar 41, and is, for example, a bolt. The shaft portion 8*a* of the fastening member 8 is inserted into the collar 41 and further inserted into the through hole 53*b* of the ground terminal 53. The fastening member 8 fastens the ground terminal 53 and the collar 41 together to the metal case 201 by screwing the shaft portion 8*a* with a mating screw portion 202. The mating screw portion 202 is, for example, a screw hole formed in the metal case 201. The mating screw portion 202 may be a screw hole of a nut. In this case, the metal case 201 includes a through hole. The fastening member 8 includes a bolt and a nut, and the ground terminal 53 and the collar 41 are fastened together to the metal case 201 by the bolt and the nut.

The fastening member 8 may be a stud bolt erecting on the metal case 201 and nuts. In this case, the stud bolt is inserted through the ground terminal 53 and the collar 41, and the nuts are screwed to the stud bolt.

As described above, the terminal block 1 of the present embodiment includes the busbars 3, the collar 41, the housing 2, and the capacitor 5. The busbars 3 are conductors connected to a device such as the PCU 100. The collar 41 is a member through which the fastening member 8 is inserted. The housing 2 is molded integrally with the busbars 3 and the collar 41. The capacitor 5 includes the casing 50 and the ground terminal 53 protruding from the casing 50. The capacitor 5 is connected to the busbars 3.

The housing 2 holds the casing 50 in a state where the ground terminal 53 faces the collar 41 so that the ground terminal 53 and the collar 41 can be fastened together to the metal case 201 by the fastening member 8. In the terminal block 1 of the present embodiment, the work of fixing the housing 2 to the metal case 201 and the work of grounding the ground terminal 53 to the metal case 201 are simultaneously executed. Therefore, the terminal block 1 of the present embodiment can be efficiently assembled to the metal case 201.

The busbars 3 of the present embodiment has the first terminal portions 31*a* and 32*a.* The first terminal portions 31*a* and 32*a* are fastened together with terminals 101 of a device such as the PCU 100 by the bolts 7 and the nuts 6. The housing 2 includes the main body 20 having the accommodating portion 25 that houses the casing 50 and the nut holder 21. The nut holder 21 is housed in the accommodating portion 25 together with the casing 50 of the capacitor 5 and engages with the main body 20. The nut holder 21 includes the first support portion 27, the second support portion 28, and the lid portion 29. The first support portion 27 and the second support portion 28 support the nuts 6 so that the nuts 6 face the first terminal portions 31*a* and 32*a.* The lid portion 29 closes the inlet 25*a* of the accommodating portion 25. The nut holder 21 of the present embodiment can arrange the nuts 6 at appropriate positions and protect the casing 50 of the capacitor 5.

The capacitor 5 of the present embodiment has the connection terminals 51 and 52 protruding from the casing 50. The connection terminals 51 and 52 are interposed between the nuts 6 and the first terminal portions 31*a* and 32*a,* respectively, and are fastened together with the first terminal portions 31*a* and 32*a* and the terminals 101 by the bolts 7 and the nuts 6. With such a structure, the connection terminals 51 and 52, the first terminal portions 31*a* and 32*a,* and the terminals 101 can be fastened together, thereby improving the workability.

Modification of Embodiment

A modification of the embodiment will be described. The device to which the first terminal portions 31*a* and 32*a* of the busbars 3 are connected is not limited to the PCU 100. The first terminal portions 31*a* and 32*a* may be connected to a terminal of a device different from the PCU 100.

The capacitor 5 may be connected to the busbars 3 in a mode different from the mode exemplified in the above embodiment. For example, the connection terminals 51 and 52 of the capacitor 5 may be connected to the busbars 3 by soldering or welding.

The shapes of the busbars 3 are not limited to the illustrated shapes. The number of terminal portions included in the busbars 31 and 32 is not limited to three. For example, the busbars 31 and 32 may not include the third terminal portions 31*c* and 32*c,* respectively. Alternatively, the busbars 31 and 32 may each have a fourth terminal portion.

The housing 2 may not include the nut holder 21. For example, in a case where the terminal block 1 does not include the nuts 6, the structure for supporting the nuts 6 is unnecessary. In this case, the housing 2 may have a capacitor holder instead of the nut holder 21. The capacitor holder is a member that supports the casing 50 of the capacitor 5 and engages with the main body 20.

The housing 2 may have no members to be housed in the accommodating portion 25 together with the casing 50. In this case, the casing 50 of the capacitor 5 may have an engaging portion that engages with the housing 2. The casing 50 housed in the accommodating portion 25 is engaged with the housing 2 by the engaging portion of the casing 50.

The housing 2 may hold the casing 50 of the capacitor 5 in a mode different from the mode of housing in the accommodating portion 25. For example, the housing 2 may include an engaging portion on a side face of the main portion 22. In this case, the housing 2 can hold the casing 50 by engaging the engaging portion of the main portion 22 with the casing 50.

The content disclosed in the above embodiment and the modifications can be implemented in combination as appropriate.

A housing of a terminal block according to the present embodiment holds a casing of a capacitor in a state where a ground terminal of the capacitor faces a collar so that the ground terminal of the capacitor and the collar can be fastened together to a metal case by a fastening member. The terminal block according to the present embodiment can be efficiently assembled to a metal case.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal block, comprising:

a busbar connected to a device;

a collar through which a fastening member is inserted;

a housing integrally molded with the busbar and the collar; and a capacitor comprising a casing and a ground terminal protruding from the casing, the capacitor connected to the busbar, wherein the housing holds the casing in a state where the ground terminal faces the collar so that the ground terminal and the collar can be fastened together to a metal case by the fastening member, wherein the busbar has a first terminal portion fastened together with a terminal of the device by a bolt and a nut, wherein the housing comprises a main body having an accommodating portion that houses the casing and a nut holder which is housed in the accommodating portion together with the casing and engages with the main body, and wherein the nut holder comprises a support portion that supports the nut so that the nut faces the first terminal portion and a lid portion that closes an inlet of the accommodating portion.

2. The terminal block according to claim 1, wherein the capacitor comprises a connection terminal protruding from the casing, and the connection terminal is interposed between the nut and the first terminal portion and is fastened together with the first terminal portion and the terminal by the bolt and the nut.

* * * * *